United States Patent
Logvinov et al.

(10) Patent No.: US 9,820,303 B2
(45) Date of Patent: Nov. 14, 2017

(54) MULTI-DESTINATION BURST PROTOCOL

(71) Applicant: STMicroelectronics, Inc., Coppell, TX (US)

(72) Inventors: Oleg Logvinov, East Brunswick, NJ (US); Aidan Cully, St. Augustine, FL (US); David Lawrence, Whitehouse Station, NJ (US); Michael Macaluso, Jackson, NJ (US)

(73) Assignee: STMicroelectronics, Inc., Coppell ( * ) Notice: Subject to any disclaimer, the term of this patent is extended or adjusted under 35 U.S.C. 154(b) by 251 days.

(21) Appl. No.: 14/849,725

(22) Filed: Sep. 10, 2015

(65) Prior Publication Data
US 2016/0183301 A1 Jun. 23, 2016

Related U.S. Application Data

(60) Provisional application No. 62/094,267, filed on Dec. 19, 2014.

(51) Int. Cl.
| | | |
|---|---|---|
| *H04W 74/08* | (2009.01) | |
| *H04L 12/18* | (2006.01) | |
| *H04L 29/06* | (2006.01) | |
| *H04B 3/54* | (2006.01) | |
| *H04L 12/413* | (2006.01) | |

(Continued)

(52) U.S. Cl.
CPC ........ *H04W 74/0808* (2013.01); *H04B 3/542* (2013.01); *H04L 1/188* (2013.01); *H04L 1/1854* (2013.01); *H04L 12/18* (2013.01); *H04L 12/1881* (2013.01); *H04L 12/413* (2013.01); *H04L 65/4076* (2013.01); *H04L 45/16* (2013.01); *H04L 2001/0093* (2013.01)

(58) Field of Classification Search
CPC .. H04W 74/0808; H04B 3/542; H04L 1/1854; H04L 1/188; H04L 12/18; H04L 12/1881; H04L 12/413; H04L 65/4076; H04L 45/16; H04L 2001/0093
USPC .................................................. 370/431, 432
See application file for complete search history.

(56) References Cited

U.S. PATENT DOCUMENTS

| | | | | |
|---|---|---|---|---|
| 2005/0018624 A1* | 1/2005 | Meier | ............... | H04L 29/12028 370/318 |
| 2005/0169296 A1* | 8/2005 | Katar | ................ | H04L 12/40156 370/445 |
| 2010/0254392 A1* | 10/2010 | Katar | .................... | H04L 12/417 370/400 |

FOREIGN PATENT DOCUMENTS

WO    WO-02103943 A1    12/2002

OTHER PUBLICATIONS

EPO Search Report and Written Opinion for EP 15187669.5 dated Apr. 12, 2016 (15 pages).

(Continued)

*Primary Examiner* — Obaidul Huq
(74) *Attorney, Agent, or Firm* — Gardere Wynne Sewell LLP

(57) ABSTRACT

Multicast transmissions are efficient but do not allow for individual acknowledgement that the data was received by each receiver. This is not acceptable for isochronous systems that require specific levels of QoS for each device. A multimedia communications protocol is provided that uses a novel multi-destination burst transmission protocol in multimedia isochronous systems. The transmitter establishes a bi-directional burst mode for multicasting data to multiple devices and receiving Reverse Start of Frame (RSOF) delimiters from each multicast-destination receiver in response to multiple SOF delimiters, thus providing protocol-efficient multi-destination acknowledgements.

16 Claims, 3 Drawing Sheets

(51) Int. Cl.
H04L 1/18 (2006.01)
H04L 12/761 (2013.01)
H04L 1/00 (2006.01)

(56) References Cited

OTHER PUBLICATIONS

Sun, Min-Te et al: "Reliable MAC Layer Multicast in IEEE 802.11 Wireless Networks," Parallel Processing, 2002, Proceedings, International Conference on Aug. 18-21, 2002, Piscataway, NJ, IEEE, pp. 527-536, XP010609122.
Daldoul, Yousri: Reliable Multicast Transport of the Video Over the WiFi Network, Dec. 16, 2013, pp. 1-127, XP055264554, Universite Sciences et Technologies Bordeaux I, retrieved from internet: URL:https://tel.archives-ouvertes.fr/tel-00919403/.
"G.hn HomePlug AV Specification : BF-055," ITU-T Draft: Study period 2005-2008, International Telecommunications Union, Geneve, CH, vol. 4/15, Dec. 3, 2007, XP017532081 (216 pages).
HomePlug® Powerline Alliance, Inc.: "HomePlug AV White Paper," document version No. HPAVWP-050818, copyright © 2005 (pp. 1-11).
Campolo Claudia et al: "A Multirate MAC Protocol for Reliable Multicast in Multihop Wireless Networks," Computer Networks, Elsevier Science Publishers B.V., Amsterdam, NL, vol. 56, No. 5, Jan. 17, 2012, pp. 1554-1567, XP028467274.
O'Mahoney, Barry et al: "G.hn: HomePlug AV Specification; BF-055," ITU-T Draft; Study Period 2005-2008, International Telecommunication Union, Geneva, CH; vol. 4/15, Dec. 3, 2007, pp. 1-602, XP017532081 (only first 208 pages applicable and attached).
Les Brown Infineon Technologies USA: "G.hn: 09CC-R12 HomePlus AV Interoperability Updates; TDO9CC-062R2," ITU-T Draft; Study Period 2009-2012, International Telecommunication Union, Geneva, CH; vol. 4/15, Aug. 25, 2009, pp. 1-153, XP044104195.
Schrum, SID et al: "G.hn: 09CC-R12a HomePlug AV Interoperability Updates; TD09CC-061R2," ITU-T Draft; Study Period 2009-2012, International Telecommunication Union,Geneva, CH; vol. 4/15, Aug. 25, 2009, pp. 1-76, XP044104194.
Pinero-Escuer P J et al: "Evaluation of a New Proposal for Efficient Multicast Transmission in HomePlug AV Based In-Home Networks," IT Revolutions (3rd International ICST Conference on IT Revolutions, Mar. 23, 2011 to Mar. 25, 2011 Cordoba); Lecture Notes of the Institute for Computer Sciences, Social-Informatics and Telecommunications Engineering ISSN 1867-8211; Springer Verlag Deu, DE, vol. 82, No. LNICST, Mar. 23, 2011, pp. 58-70, XP008179665.
Pinero P J et al: "Analysis and Improvement of Multicast Communications in HomePlug AV-Based In-Home Networks," Computer Networks, vol. 62, Apr. 2014, pp. 89-100, XP028633295.

* cited by examiner

US 9,820,303 B2

MULTI-DESTINATION BURST PROTOCOL

PRIORITY CLAIM

This application claimed priority to U.S. Provisional Application for Patent No. 62/094,267 filed Dec. 19, 2014, the disclosure of which is incorporated by reference.

TECHNICAL FIELD

The present invention relates generally to a method and apparatus for a packet-based multi-destination communication protocol which reduces packet latency and jitter in multimedia applications.

BACKGROUND

Communication of multimedia data requires optimum performance in several parameters in order to provide the data fast enough to preserve the quality of the multimedia services (quality of service—QoS) being offered, such as VoIP, audio distribution or video distribution. The data rate, i.e., the rate of signaling each data bit or symbol, has to be fast enough to provide data at the rate of or faster than the rate of consumption by the receiving device's application. In packet data communications protocols, the data rate is further complicated by the delay between sending the packets of data. The delay in delivering an individual packet of data is the packet latency. The variation of the delay across multiple receive packets is called jitter. In highly congested shared networks, devices use various methods to contend for access to the network so their packets can be sent with low enough latency and jitter in order to ensure the necessary QoS requirements of the data-consuming application.

In some communications protocols, for example Home-Plug® AV and AV2, which are hereby incorporated by reference, a "regular" media access control (MAC) protocol data unit (MPDU) can be transmitted to a receiving node's physical layer (PHY) of the OSI model and receive an acknowledgement (ACK) back for each successfully transmitted MPDU. These protocols also support a burst mode which allows the transmitter to transmit multiple long MPDUs without relinquishing the medium, and before soliciting a response. The response, a selective acknowledgement (SACK) from the receiver back to the transmitter, provides the reception status for all of the MPDU's being sent by the transmitting PHY to the receiver's PHY. Long MPDUs in burst mode are separated by burst interfame spacing (BIFS). Because MPDU bursts only require the single SACK response, the time to send packets and get ACK responses is reduced and the protocol efficiency increases for that communications exchange. In the burst mode, the start of frame (SOF) delimiter contains a counter field (MPDUCnt) that indicates how many MPDUs follow the current MPDU (with the value "0" indicating the last MPDU in the sequence. FIG. 1 shows an example of MPDU bursting as known to those skilled in the art.

The protocols cited above also also allow for bidirectional bursting. In this mode, transmitter allows part of the time it reserved to burst data to the receiver for the receiver to send data back to the original transmitter. It serves as an effective back channel that does not need to be negotiated with the network. The receiving station initiates bi-directional bursting by sending "request reverse transmission flag" (RRTF) and "request reverse transmission length" (RRTL) fields in the frame control section of the SACK. The RRTL field specifies the minimum required frame length for the Reverse SOF (RSOF) MPDU. Upon receiving the request, the original transmitter decides whether to honor the request and the duration. Obviously, if the request is for more time than the original transmitter has reserved, it will be denied.

FIG. 2 illustrates an example of the bidirectional burst mechanism as known in the art. When the receiver (Dev B) determines that it wants to transmit in the reverse direction, it sets the RRTF and RRTL fields in the SACK or RSOF. This is set until the original transmitter (Dev A) responds, granting the request for the maximum duration, or until there is no longer a need to request a transmission in the reverse direction.

FIG. 3 shows the various interframe spaces during a bidirectional burst. These spaces result in increased latency (reduced efficiency).

The burst mode does not support communicating with more than one device during a burst which means that each individual communication with a receiver has to be initiated separately. A better method is needed to improve packet latency and hence communications efficiency in congested multimedia networks.

SUMMARY OF THE INVENTION

In an embodiment, a multimedia communications protocol is presented that solves the problem of excessive packet latency and jitter by enabling communications between a transmitter and individual receivers (i.e., "multi-destinations") by using multicast distribution (one to many) and establishing separately the pseudo contention free periods (PCFP) within a bidirectional burst mode for acknowledgments from the individual receivers. A Start of Frame delimiter for each receiver in the multicast distribution group establishes the specific PCFP within in which each receiver sends an acknowledgement. The disclosed protocol and method has the ability to be used within existing CSMA-based protocols while maintaining compatibility.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DRAWINGS

The making and using of embodiments are discussed in detail below. It should be appreciated, however, that the present disclosure provides many applicable inventive concepts that may be embodied in a wide variety of specific contexts. The specific embodiments discussed are merely illustrative of specific ways to make and use the invention, and do not limit the scope of the invention.

Embodiments herein are described, without limitation, in a specific context of a protocol method and apparatus used to minimize communications packet latency and jitter for data used by multimedia devices such as audio systems wherein all of the individual network devices act as a group that has isochronous QoS requirements in order to deliver one combined experience. This disclosure also uses the HomePlug AV specification as contextual framework (including terms) for presenting the invention, although the disclosed invention is not limited to that protocol. The HomePlug AV specification specifically defines a bidirectional bursting protocol that uses SOFs and RSOFs for sequential MPDU payload transmissions and acknowledgements, however this process is only specified from one transmitter to one receiver. It is specifically not applicable to multicast transmissions with multiple destinations and consequently is not as efficient for reducing packet latency as the disclosed method. In this disclosure, "receiver" is a topology term to help distinguish between a multicast transmitter and the receiving multicast destinations, but all transmitters and receivers described here are functionally transceivers.

In accordance with the present disclosure, network initialization data is programmed, by one or more methods such as a user interface or at the time of manufacture or a discovery protocol, with the data about devices on the network that are part of a group of multimedia devices on the network that function together, such as an audio sound system that is rendering one music file. The digital information includes identifiers (such as device ID, MAC ID, Link ID), topology digital information (such as a sequence number for all of the devices in the network that define the device order within the group), a sequence back-off value, as well as delimiter frame lengths and other information as embodied below. The initialization data can be field programmable in order to allow equipment to be replaced or repurposed after the sale or installation.

Figure 1:
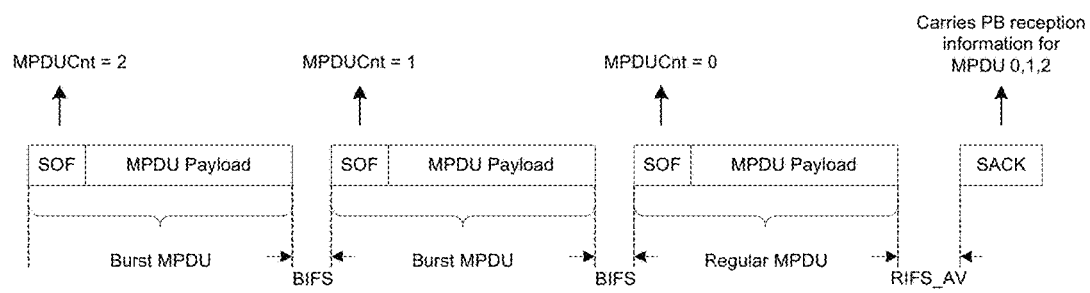
FIG. 1 illustrates an example of a MPDU bursting sequence.
Figure 2:
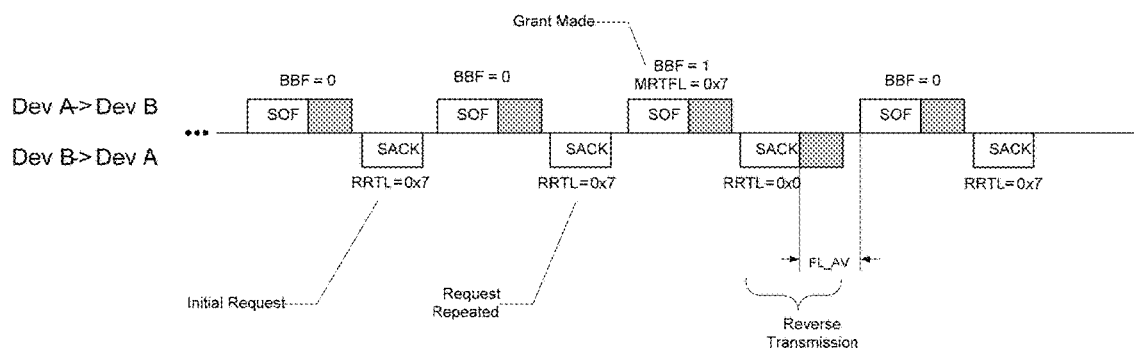
FIG. 2 illustrates an example of the bidirectional burst sequence.
Figure 3:
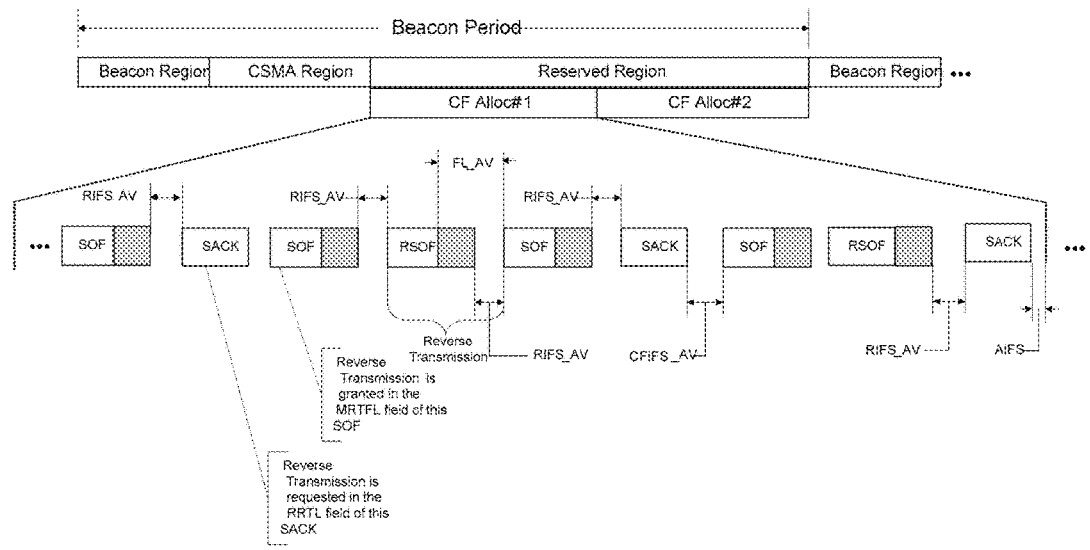
FIG. 3 illustrates interframe spacing used in bidirectional bursting.
Figure 4:
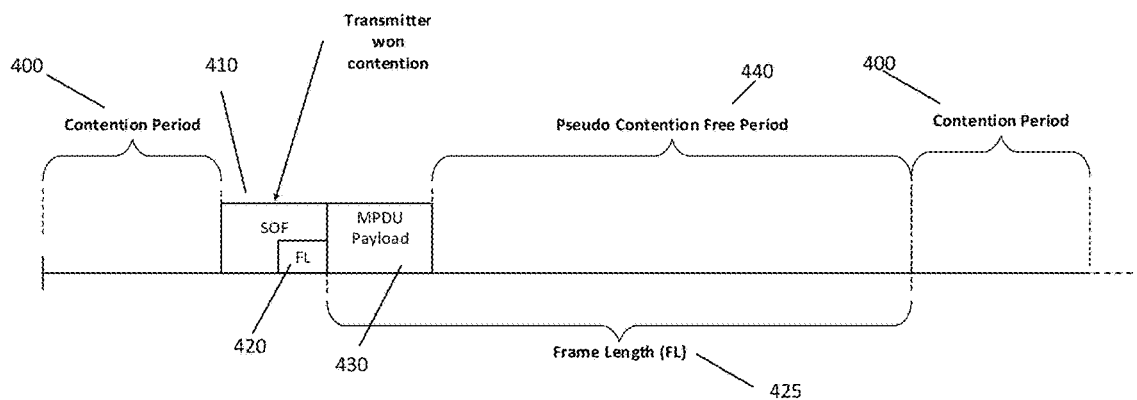
FIG. 4 illustrates the pseudo contention free period according to an embodiment.
Figure 5:
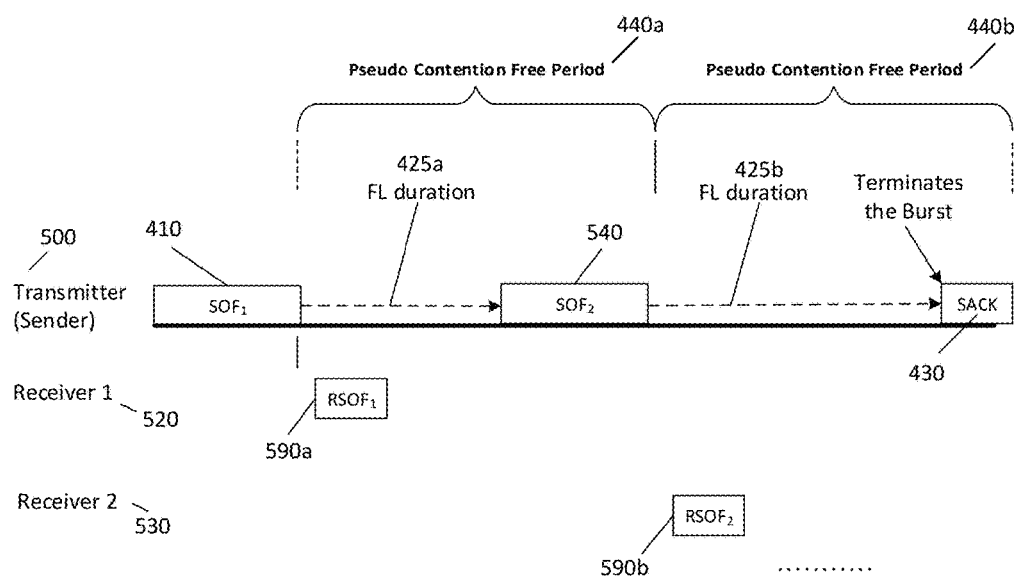
FIG. 5 illustrates an example of a CSMA protocol using the multi-destination SOF and RSOF protocol according to an embodiment.

In accordance with an embodiment, FIGS. 4 and 5 illustrate a multi-destination protocol method using multiple pseudo contention free periods comprising multiple SOFs. Each SOF and associated pseudo contention free period is used for one of the multicast receiver's acknowledgment. When a transmitter 500 has won a CSMA contention process 400 of a carrier sense multiple access (CSMA) protocol, the transmitter transmits a start of frame (SOF) delimiter 410 which contains data including the frame length (FL) field 420 (a digital value representing duration in time). The SOF keeps the channel reserved for the transmitter to communicate with the multicast group. It also transmits the MAC protocol data unit (MPDU) payload 430. The multicast transmission is addressed to all "n" members of a group of receiving devices 520, 530 that share a common function such as the audio speaker system previously mentioned. The SOF and MPDU are followed by a pseudo contention free acknowledgment period (PCFP) 440 that last for the Frame Length (FL) duration 425$a$ minus the time the MPDU payload 430 uses. During the pseudo contention free acknowledgment period 440$a$, one of the devices in the group acknowledges the status of the multicast packet using a reverse start of frame (RSOF) delimiter 590$a$. The delimiter can be sent as soon as a RSOF interframe space allows the transmitter and receiver to switch roles. Which receiver responds is determined in advance of this protocol using a Link ID or a group sequence number so that only one device responds per SOF. As soon as the RSOF 590$a$ is received, or just before the FL duration 425$a$ expires, a subsequent SOF$_n$ 540 is transmitted to continue the PCFP for a new duration 425$b$. The SOF$_2$ also contains the identity of a member of the multicast group that may respond with a RSOF$_2$ 590$b$ during the new PCFP 440$b$. Subsequent SOFs are transmitted until all of the devices in the group have had the opportunity to acknowledge the multicast packet. The concatenated PCFPs ends when the last device transmits a SACK 430 delimiter, the last FL duration expires, or the maximum concatenated PCFP durations allowed by convention has been reached (typically 5 to 10 ms). Any group device can terminate the multi-destination protocol early by sending a SACK during the PCFP. If a receiver fails to acknowledge the SOF, the original transmitter can send another SOF directed to the receiver.

In one embodiment, the SOF 410 can be retransmitted before the subsequent SOFs 540 if the RSOF 590$a$ has not been received within the PCFP 440$a$.

In another embodiment, the acknowledgment contains digital information about the quality of the received data and the communications channel. The tone map associated with each SOF may be different so that communications with specific receivers may be optimized for the best possible combination of tone map parameters (such as convolution coding rate, bit loading, tone map, etc.) in order to optimize the communications efficiency. The transmitter may also analyze the quality data provided by all of the acknowledgements from the multicast group and decide on an improved tone map for the entire group of receivers.

By modifying the SOF delimiter to specifically request acknowledgments from receivers that were addressed in the multicast, separate transactions to send the same MPDU payload to multiple destinations and the interface spacings are avoided and the latency and jitter between multicast MPDUs is reduced.

The disclosed protocol method is an independent method but is also compatible with and can be used to modify existing native protocols such as the IEEE 802.11 series standard, the IEEE 1901-2010 standard and HomePlug AV-based specifications. The ability to hold off a transmission for an acknowledgement period is similar to HomePlug AV's bidirectional burst method except that the protocol herein modifies the SOF and RSOF delimiters to support multi-acknowledgements from multiple receivers which is specifically not permitted or anticipated in HomePlug AV. By modifying an existing mechanism, the protocol herein can be initialized using compatible delimiters and operates within the acknowledgement period which is isolated from and can contain a protocol that is different from the native protocol, without affecting the native protocol. In this way the protocol can be used to modify an existing (native) protocol to support the protocol herein.

In addition, if the transmitter determines that due to the communications quality, the communications improvement provided by this protocol is less than that which can be accomplished by native methods, the multi-destination protocol may be switched off until channel conditions improve, without affecting the compatibility and interoperability with the native protocol.

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

What is claimed is:

1. A method for multicast communications in a carrier sense multiple access (CSMA) network including a transmitter and a multicast group of receiving devices including at least two receiving devices, the method comprising:

making a multicast transmission to the multicast group using a Start of Frame (SOF) delimiter that includes a frame length of a first bidirectional burst pseudo contention free period during which the transmitter communicates without contention;

wherein the SOF further includes an identification of a first one of the receiving devices in the multicast group that is allowed to transmit in a first pseudo contention free period;

responding by said first one of said receiving devices to the first SOF delimiter with a first acknowledgement of status of received multicast media access control (MAC) protocol data unit (MPDU) data;

transmitting a second SOF before an end of the frame length of the first SOF that is addressed to a second one of the receiving devices;

acknowledging by the second one of the receiving devices the status of the received multicast MPDU data using a second acknowledgement; and continuing subsequent SOF and acknowledgement process until one of: a last one of the receiving devices in the multicast group has been addressed by a SOF and has responded or the first bidirectional burst is terminated.

2. The method of claim 1, wherein the acknowledgement is a Reverse SOF (RSOF) delimiter.

3. The method of claim 1, wherein the last receiver in the group responds with a selective acknowledgement (SACK) in order to terminate the first bidirectional burst.

4. The method of claim 1, wherein any receiver in the multi-destination protocol sequence can terminate the first bidirectional burst by sending a selective acknowledgement (SACK).

5. The method of claim 1, wherein the acknowledgement contains digital information about communications quality, and further comprising using said digital information about communications quality by the transmitter to determine best parameters to use in a common Tone Map for subsequent multicast transmissions.

6. The method of claim 1, wherein the acknowledgement contains digital information about communications quality, and further comprising using said digital information about communications quality by the transmitter to determine best parameters to use for all SOFs in order to optimize acknowledgement transmissions from the receivers.

7. The methods of claim 1, wherein a link identification (LID) is used by different SOFs to identify the multicast group member which is allowed to acknowledge the multicast MPDU data.

8. The method of claim 1, wherein the acknowledgement contains digital information about communications quality, and further comprising using said digital information about communications quality by the transmitter to determine best parameters to use for each SOF for that device in order to optimize acknowledgement transmissions from the receivers.

9. A method for use in a communications system including a carrier sense multiple access (CSMA) network including a transmitter and a multicast group of receiving devices including at least two receiving devices, the method comprising:

making a multicast transmission to the multicast group using a Start of Frame (SOF) delimiter addressed to a first one of the receiving devices that determines a frame length of a first bidirectional burst pseudo contention free period during which the transmitter communicates without contention;

wherein the SOF comprises an identification of the first one of the receiving devices in the multicast group that is allowed to transmit in the first pseudo contention free period;

responding by the first one of the receiving devices to the first SOF delimiter with a first acknowledgement to indicate the status of received multicast media access control (MAC) protocol data unit (MPDU) data;

transmitting a second SOF before the end of the frame length of the first SOF that that is addressed to a second one of the receiving devices, acknowledging by the second one of the receiving devices the status of the received multicast MPDU data using a second acknowledgement;

continuing subsequent SOF and acknowledgement until one of: a last one of the receiving devices in the multicast group has been addressed by a SOF and responded, or the first bidirectional burst is terminated; and wherein the multicast transmission does not adversely affect interoperability with a native CSMA protocol within which the multicast transmission is used.

10. The method of claim 9, wherein the acknowledgement is a Reverse SOF (RSOF) delimiter.

11. The method of claim 9, wherein the last receiver in the group responds with a selective acknowledgement (SACK) in order to terminate the first bidirectional burst.

12. The method of claim 9, wherein any receiver in the sequence can terminate the first bidirectional burst by sending a selective acknowledgement (SACK).

13. The method of claim 9, wherein the acknowledgement contains digital information about communications quality, and further comprising using the digital information about communications quality by the transmitter to determine best parameters to use in a common Tone Map for subsequent multicast transmissions.

14. The method of claim 9, wherein the acknowledgement contains digital information about communications quality, and further comprising using the digital information about communications quality by the transmitter to determine best parameters to use for all SOFs in order to optimize acknowledgement transmissions.

15. The method of claim 9, wherein a link identification (LID) is used by different SOFs to identify the group member which is allowed to acknowledge the multicast MPDU data.

16. The method of claim 9, wherein the acknowledgement contains digital information about communications quality, and further comprising using the digital information about communications quality by the transmitter to determine best parameters to use for each SOFs in order to optimize acknowledgement transmissions.

\* \* \* \* \*